S. D. INGHAM.
Meat Mangles.

No. 143,158. Patented September 23, 1873.

ATTEST.
Jas. H. Layman,
Walter Allen

Saml. D. Ingham
By Knight Bros.
ATT'YS.

UNITED STATES PATENT OFFICE.

SAMUEL D. INGHAM, OF RIPLEY, OHIO.

IMPROVEMENT IN MEAT-MANGLES.

Specification forming part of Letters Patent No. 143,158, dated September 23, 1873; application filed August 8, 1873.

*To all whom it may concern:*

Be it known that I, SAMUEL D. INGHAM, of Ripley, Brown county, Ohio, have invented a new and useful Meat-Mangle, of which the following is a specification:

My invention relates to a convenient hand instrument for tendering meat, slivering dough, vegetables, &c., and performing other services of a culinary character. The invention consists in the combination of a gang of notched circular knives, a clearer, and means for adjusting the latter, the offices of the adjustable clearer being to free the knives from any matter which may adhere thereto and to lock the knives so that they shall cut with a drawing action, or to unlock them, so that they may rotate and cut with a rolling action.

Figure 1:
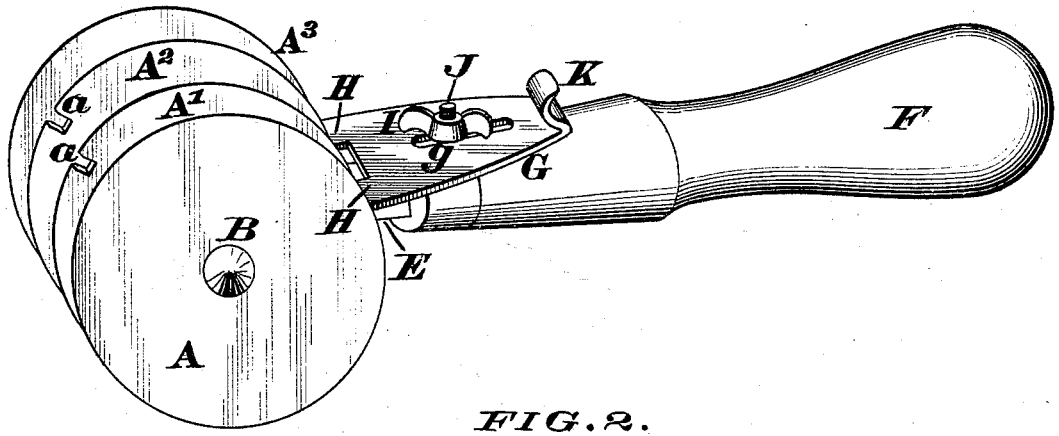
Figure 2:
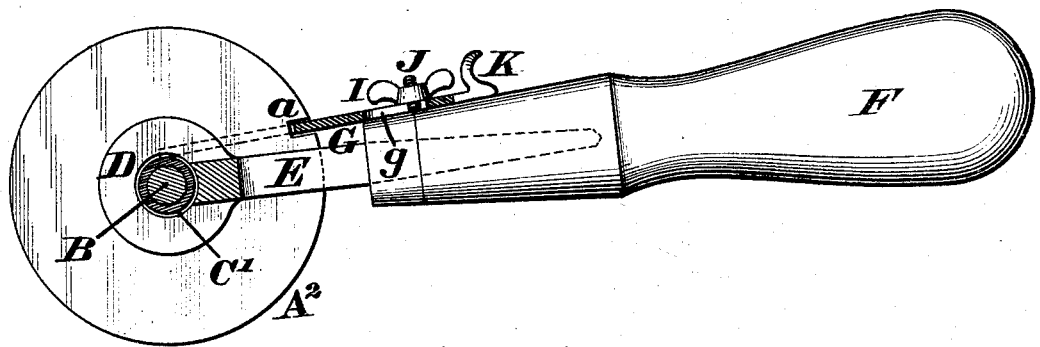
Figure 3:
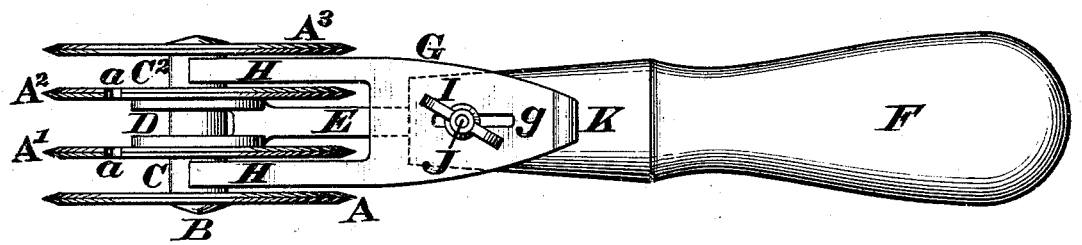
Figure 4:
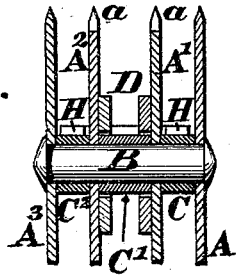

Figure 1 is a perspective view of my mangle in its unlocked condition. Fig. 2 is a partly-sectionized elevation of the same in its locked condition. Fig. 3 is a top view of the unlocked mangle. Fig. 4 is an axial section of the knives or disks, a portion of the latter being broken away.

A $A^1$ $A^2$ $A^3$ are a congeries of similar disks of steel, sharpened at their peripheries, and firmly united in a gang by means of riveted axle B and sleeves C $C^1$ $C^2$. That portion of the axle or sleeve $C^1$ between the inner pair of disks occupies a yoke or bearing, D, whose shank E is furnished with a convenient handle, F, preferably of wood. The shank E serves also to loosen any fragments adhering to the inner sides of the two inner knives.

In order to similarly clear the outer knives I provide a plate, G, having two or more fingers, H, which pass between and nearly touch the disks, and which is secured at any desired position upon the handle by means of a nut, I, which is tapped to a screw, J, that projects from said handle through a slot, $g$, in said plate. Said plate may also have a lip, K, to facilitate its adjustment out or in.

In the most forward position of the plate the position of its edge between the two fingers occupies notches $a$ in the two inner disks, and thus prevents the gang revolving.

In order more effectually to prevent the knives revolving independently of one another, they may have square or other non-circular apertures, fitting an axle of corresponding shape; and additional fingers may be provided outside of the gang, as well as between the consecutive knives, so as to clean every part of the same, and the edges of the knives may be serrated or scalloped, if desired.

The axle may be screw-threaded and be secured in place by one or more nuts, so as to enable the knives to be removed for sharpening or replacement.

I claim as new and of my invention—

The adjustable clearer G $g$ H, nut I, and screw J, in combination with the notched circular knives A $A^1$ $A^2$ $A^3$, substantially as herein shown and described, for the purposes specified.

In testimony of which invention I hereunto set my hand.

SAMUEL D. INGHAM.

Attest:
GEO. H. KNIGHT,
F. F. SHAW.